US012803749B2

(12) United States Patent
Li

(10) Patent No.: US 12,803,749 B2
(45) Date of Patent: Nov. 17, 2026

(54) RESOURCE CONFIGURATION METHOD AND APPARATUS, DEVICE, AND STORAGE MEDIUM

(71) Applicant: Beijing Xiaomi Mobile Software Co., Ltd., Beijing (CN)

(72) Inventor: Mingju Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 268 days.

(21) Appl. No.: 18/692,358

(22) PCT Filed: Sep. 28, 2021

(86) PCT No.: PCT/CN2021/121295
§ 371 (c)(1),
(2) Date: Mar. 15, 2024

(87) PCT Pub. No.: WO2023/050056
PCT Pub. Date: Apr. 6, 2023

(65) Prior Publication Data
US 2024/0388402 A1 Nov. 21, 2024

(51) Int. Cl.
*H04L 5/00* (2006.01)

(52) U.S. Cl.
CPC .......... *H04L 5/0051* (2013.01); *H04L 5/0094* (2013.01)

(58) Field of Classification Search
CPC ..... H04L 5/005; H04L 5/0094; H04L 5/0048; H04L 5/0007; H04W 72/04; H04W 72/0446; H04W 72/0453; H04W 64/00
See application file for complete search history.

(56) References Cited

U.S. PATENT DOCUMENTS

| | | | | |
|---|---|---|---|---|
| 2020/0267686 | A1* | 8/2020 | Hunukumbure .. | H04W 72/0446 |
| 2021/0234650 | A1 | 7/2021 | Kim et al. | |

FOREIGN PATENT DOCUMENTS

| | | | |
|---|---|---|---|
| CN | 110365455 | A | 10/2019 |
| CN | 111277385 | A | 6/2020 |
| CN | 111278130 | A | 6/2020 |
| CN | 111435887 | A | 7/2020 |
| CN | 111837353 | A | 10/2020 |
| CN | 111869156 | A | 10/2020 |
| CN | 113302994 | A | 8/2021 |
| WO | 2019034252 | A1 | 2/2019 |
| WO | 2020091656 | A1 | 5/2020 |

(Continued)

OTHER PUBLICATIONS

"DL PRS design for NR positioning", Huawei, HiSilicon, 3GPP TSG RAN WG1 Meeting #98, R1-1908114, Prague, Czech Republic, Aug. 26-30, 2019, 9 pages.

(Continued)

*Primary Examiner* — Jamal Javaid
(74) *Attorney, Agent, or Firm* — Finnegan, Henderson, Farabow, Garrett & Dunner, L.L.P.

(57) ABSTRACT

A resource configuration method is performed by a terminal, and includes: receiving first resource configuration information sent by a network device, the first resource configuration information indicating a transmission resource of a first reference signal, and the first reference signal being a reference signal for a positioning purpose; wherein a frequency domain resource in the transmission resource comprises at least one carrier.

20 Claims, 3 Drawing Sheets

(56) References Cited

FOREIGN PATENT DOCUMENTS

| | | | | |
|---|---|---|---|---|
| WO | 2020154289 A1 | | 7/2020 | |
| WO | WO-2020204598 A1 | * | 10/2020 | ............ H04W 64/00 |
| WO | WO 2021159472 A1 | | 8/2021 | |

OTHER PUBLICATIONS

The First Office Action issued by the State Intellectual Property Office of People's Republic of China on Aug. 15, 2025, in corresponding Application No. CN 202180003095.0, 15 pages.
"Other accuracy enhancements for NR positioning", ZTE, 3GPP TSG RAN WG1 Meeting #104-e, R1-2100296, e-Meeting, Jan. 25-Feb. 5, 2021, 7 pages.
"DL Reference Signals for NR Positioning", Samsung, 3GPP TSG RAN WG1 #99, R1-1912490, Reno, USA, Nov. 18-22, 2019, 14 pages.
Notice of Reasons for Refusal issued by the Japanese Patent Office on Aug. 1, 2025, in corresponding Application No. JP 2024-517385, 12 pages.
Extended European Search Report Issued in Application No. 21958655.9 dated Jul. 9, 2025, 10 pages.
International Search Report and Written Opinion of International Application No. PCT/CN2021/121295, dated May 27, 2022, 15 pages.
CATT, "Discussion on HST-SFN transmission schemes," 3GPP TSG RAN WG1 #105-e, R1-2104487, e-Meeting, May 19-27, 2021, 19 pages.

* cited by examiner

RESOURCE CONFIGURATION METHOD AND APPARATUS, DEVICE, AND STORAGE MEDIUM

CROSS REFERENCE TO RELATED APPLICATIONS

This application is a U.S. national phase of International Application No. PCT/CN2021/121295, filed on Sep. 28, 2021, the entire contents of which are incorporated herein by reference.

TECHNICAL FIELD

The disclosure relates to a field of communication technologies, more particularly, to a resource configuration method, a resource configuration apparatus, a device and a storage medium.

BACKGROUND

In order to achieve positioning, the 3rd Generation Partnership Project (3GPP) has introduced a reference signal for a positioning purpose in a New Radio (NR) system.

For downlink, the reference signals for the positioning purpose includes a Positioning Reference Signal (PRS). For uplink, the reference signal for the positioning purpose includes a Sounding Reference Signal (SRS).

SUMMARY

According to an aspect of the disclosure, a resource configuration method, performed by a terminal, is provided. The method includes:

receiving first resource configuration information sent by a network device, the first resource configuration information indicating a transmission resource of a first reference signal, and the first reference signal being a reference signal for a positioning purpose; in which, a frequency domain resource in the transmission resource includes at least one carrier.

According to an aspect of the disclosure, a resource configuration method, performed by a network device, is provided. The method includes:

sending first resource configuration information to a terminal, the first resource configuration information indicating a transmission resource of a first reference signal, and the first reference signal being a reference signal for a positioning purpose; in which, a frequency domain resource in the transmission resource includes at least one carrier.

According to an aspect of the disclosure, a terminal is provided. The terminal includes: a processor and a transceiver coupled to the processor. The processor is configured to load and execute executable instructions to implement the resource configuration method on the terminal side.

According to an aspect of the disclosure, a network device is provided. The network device includes: a processor and a transceiver coupled to the processor. The processor is configured to load and execute executable instructions to implement the resource configuration method on the network device side.

BRIEF DESCRIPTION OF THE DRAWINGS

The accompanying drawings of the present disclosure will be briefly introduced below. Obviously, the drawings in the following description are only example embodiments of the disclosure.

DETAILED DESCRIPTION

In order to make the purpose, technical solutions and advantages of the disclosure clearer, the implementations of the disclosure will be further described in detail below with reference to the accompanying drawings.

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the embodiments of the disclosure. Instead, they are merely examples of apparatuses and methods consistent with aspects related to the disclosure as recited in the appended claims.

The terms used in the embodiments of the disclosure are only for the purpose of describing specific embodiments, and are not intended to limit the disclosure. The singular forms of "a", "said", and "the" used in the disclosure and the appended claims are also intended to include plural forms, unless the context clearly indicates other meanings. It should also be understood that the term "and/or" as used herein refers to and includes any or all possible combinations of one or more associated listed items.

It is understandable that although the terms "first", "second", and "third" may be used in the embodiments of the disclosure to describe various information, the information should not be limited to these terms. These terms are only used to distinguish the same type of information from each other. For example, without departing from the scope of the disclosure, the first information may also be referred to as the second information, and similarly, the second information may also be referred to as the first information. Depending on the context, the term "if" as used herein can be interpreted as "when", "while" or "in response to determining".

Generally, transmission of one reference signal for a positioning purpose occupies one frequency layer. However, the transmission of one frequency layer may not achieve sufficient positioning accuracy, and thus cannot meet requirements for precise positioning. Therefore, further discussion and research is needed on how to configure the transmission of the reference signal for the positioning purpose, to improve the positioning accuracy. Thus, embodiments of the disclosure provide a resource configuration method, a resource configuration apparatus, a device and a storage medium, to improve positioning accuracy.

Figure 1:
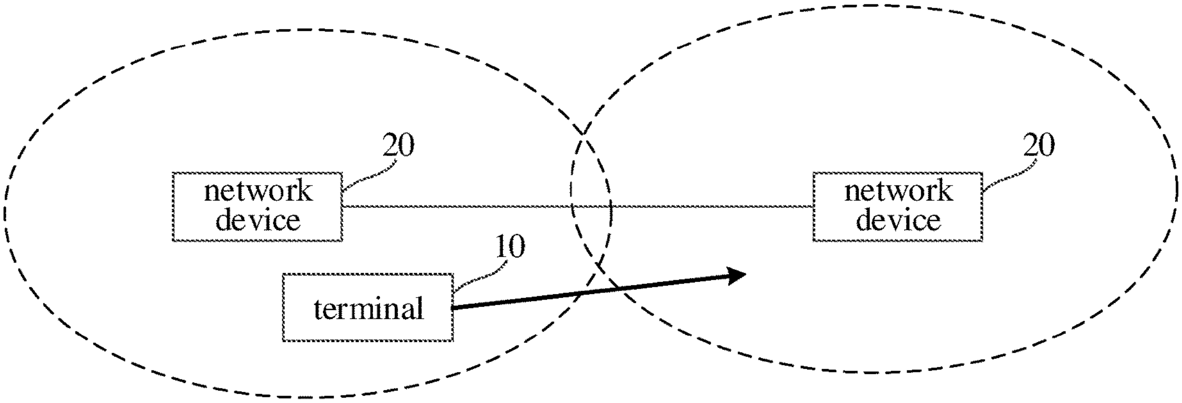
FIG. 1 is a schematic diagram of a communication system provided by an exemplary embodiment of the disclosure.

FIG. 1 is a schematic diagram of a communication system provided by an embodiment of the disclosure. The communication system may include: a terminal 10 and a network device 20.

Generally, there are multiple terminals 10. One or more terminals 10 may be distributed within a cell managed by the network device 20. The terminal 10 may include a variety of handheld devices with a wireless communication capability, in-vehicle devices, wearable devices, computing devices, or other processing devices connected to a wireless modem, as well as various forms of User Equipments (UEs), Mobile Stations (MSs), etc. For ease of description, in embodiments of the disclosure, the above mentioned devices are collectively referred to as a terminal.

The network device 20 is a device deployed in an access network to provide a wireless communication capability for the terminal 10. The network device 20 may include various forms of macro base stations, micro base stations, relay stations, access points, etc. In systems using different wireless access technologies, names of devices with a network device function may be different. For example, in a new radio (NR) system, it is called a gNodeB or a gNB. The name "network device" may change as the communication technologies evolve. For convenience of description, in embodiments of the disclosure, the above devices providing the wireless communication function for the terminal 10 are collectively referred to as a network device.

The network device 20 may also be a Location Management Function (LMF) network element. Optionally, the LMF network element includes a location server. The location server may be realized as any of: a LMF network element, an Enhanced Serving Mobile Location Centre (E-SMLC), a Secure User Plane Location (SUPL), and a SUPL Location Platform (SUPL SLP).

Optionally, a connection may be established between the network device 20 and the terminal 10 via a radio. Communication over the connection can be carried out, which includes signaling and data interaction. Optionally, there may be a plurality of network devices 20, and communication between two adjacent network devices 20 may also be carried out in a wired or wireless manner. Optionally, the terminal 10 may switch between different network devices 20, i.e., may establish connections with different network devices 20.

It should be understood that the NR system in the embodiments of the disclosure may also be referred to as a 5th-Generation Mobile Communication Technology (5G) system or a 5G NR system, the meaning of which can be understood by those skilled in the art. The technical solutions described in the embodiments of the disclosure may be applied to the NR system, as well as to future evolution systems of the NR system.

Figure 2:
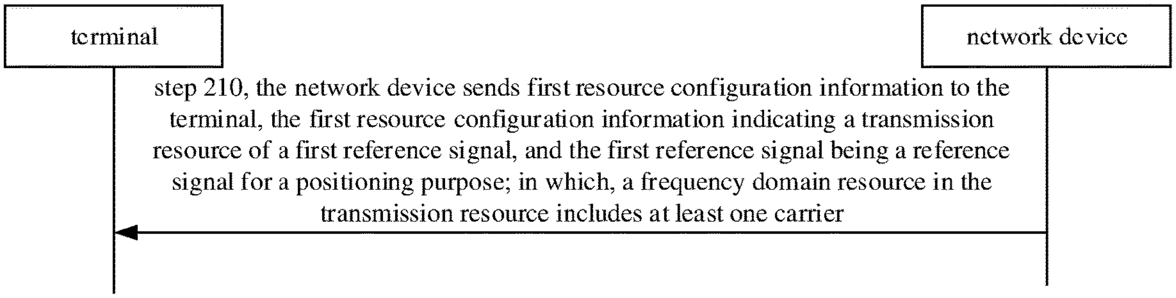
FIG. 2 is a flowchart of a resource configuration method provided by an exemplary embodiment of the disclosure.

FIG. 2 is a flowchart of a resource configuration method provided by an embodiment of the disclosure. The method can be used in the communication system shown in FIG. 1. The method includes the following steps.

At step 210, a network device sends first resource configuration information to a terminal, in which the first resource configuration information is configured to indicate a transmission resource of a first reference signal, and the first reference signal is a reference signal for a positioning purpose; in which, a frequency domain resource in the transmission resource includes at least one carrier.

The first reference signal is a positioning-purpose reference signal, which is used for realizing positioning, for example, for realizing positioning the terminal. On the basis, the first reference signal may also be referred to as a reference signal for the positioning purpose. For ease of description, it is collectively referred to as the first reference signal in the embodiments of the disclosure. A type of the first reference signal is not limited in the embodiments of the disclosure, which may be realized as either an uplink signal or a downlink signal. In an example, the first reference signal includes at least one of: a positioning reference signal (PRS), and or a sounding reference signal (SRS). Optionally, the PRS is realized as a downlink signal, and the SRS is realized as an uplink signal.

In order to inform the terminal of the transmission resource of the first reference signal, the network device sends the first resource configuration information to the terminal. The first resource configuration information is used to indicate the transmission resource of the first reference signal. In embodiments of the disclosure, in order to improve positioning accuracy, the first reference signal is transmitted based on carrier aggregation. That is, the frequency domain resource in the transmission resource of the first reference signal includes at least one carrier, and the first reference signal is transmitted on at least one carrier.

The contents of the first resource configuration information is not limited in the embodiments of the disclosure. Optionally, the transmission resource of the first reference signal includes a time domain resource, and the first resource configuration information includes a time domain parameter. The transmission resource of the first reference signal includes a frequency domain resource, and the first resource configuration information includes a frequency domain parameter. The transmission resource of the first reference signal includes a transmitting power, and the first resource configuration information includes a power parameter. Certainly, the transmission resource of the first reference signal may include any combinations of the time domain resource, the frequency domain resource, and the transmitting power, and the first resource configuration information includes parameters corresponding to the individual content of the transmission resource. For example, the transmission resource of the first reference signal includes the time domain resource and the frequency domain resource, then the first resource configuration information includes a time domain parameter and a frequency domain parameter.

The time domain resource and the time domain parameter are introduced and explained below.

In a possible implementation, the Sub-Carrier Space (SCS) on the at least one carrier is identical.

On the basis, in an example, the first resource configuration information includes: a time domain parameter corresponding to the transmission resource, and the time domain parameter is used to indicate a time domain resource on the at least one carrier. That is, the at least one carrier occupied by the transmission of the first reference signal corresponds to the same time domain parameter. Therefore, the network device may configure a set of time domain parameters in the first resource configuration information, and each of the at least one carrier corresponds to the set of time domain parameters. Certainly, the network device may also configure a time domain parameter corresponding to each of the at least one carrier in the first resource configuration information, and the at least one carrier corresponds to the same time domain parameter. Optionally, the time domain parameter includes at least one of: a cycle, a start slot, a start symbol, or a number of occupied symbols.

In an implementation, in the case where the SCS on the at least one carrier is identical, the time domain resource on the at least one carrier can be configured uniformly, to reduce the configuration overhead of the network device for the time domain resource and reduce the number of bits occupied by the first resource configuration information.

In another possible implementation, at least two carriers in the at least one carrier have different SCSs.

On the basis, in an example, the first resource configuration information includes a time domain parameter corresponding to a reference carrier in the at least one carrier. The time domain parameter corresponding to the reference carrier is configured to indicate a time domain resource on the reference carrier. Optionally, a time domain resource on each carrier other than the reference carrier in the at least one carrier is identical to the time domain resource on the reference carrier. That is, the network device may configure a set of time domain parameters in the first resource configuration information, and the set of time domain parameters is used to indicate the time domain resource on the reference carrier. The time domain resource on each carrier other than the reference carrier is determined based on the time domain resource on the reference carrier. Optionally, the reference carrier is a carrier having a minimum SCS in the at least one carrier, or, the reference carrier is a carrier having a maximum SCS in the at least one carrier. Optionally, the time domain parameter includes at least one of: a cycle, a start slot, a start symbol, or a number of occupied symbols.

In this example, in a case where SCSs on at least two carriers are different, by selecting the reference carrier from the at least one carrier and configuring the time domain resource on the reference carrier, the time domain resource on each carrier other than the reference carrier is determined based on the time domain resource on the reference carrier. The network device can simultaneously configure the time domain resources on other carriers by configuring only the time domain resource on the reference carrier, to reduce the network device's configuration overhead for the time domain resource, and to reduce the number of bits occupied by the first resource configuration information.

Figure 3:
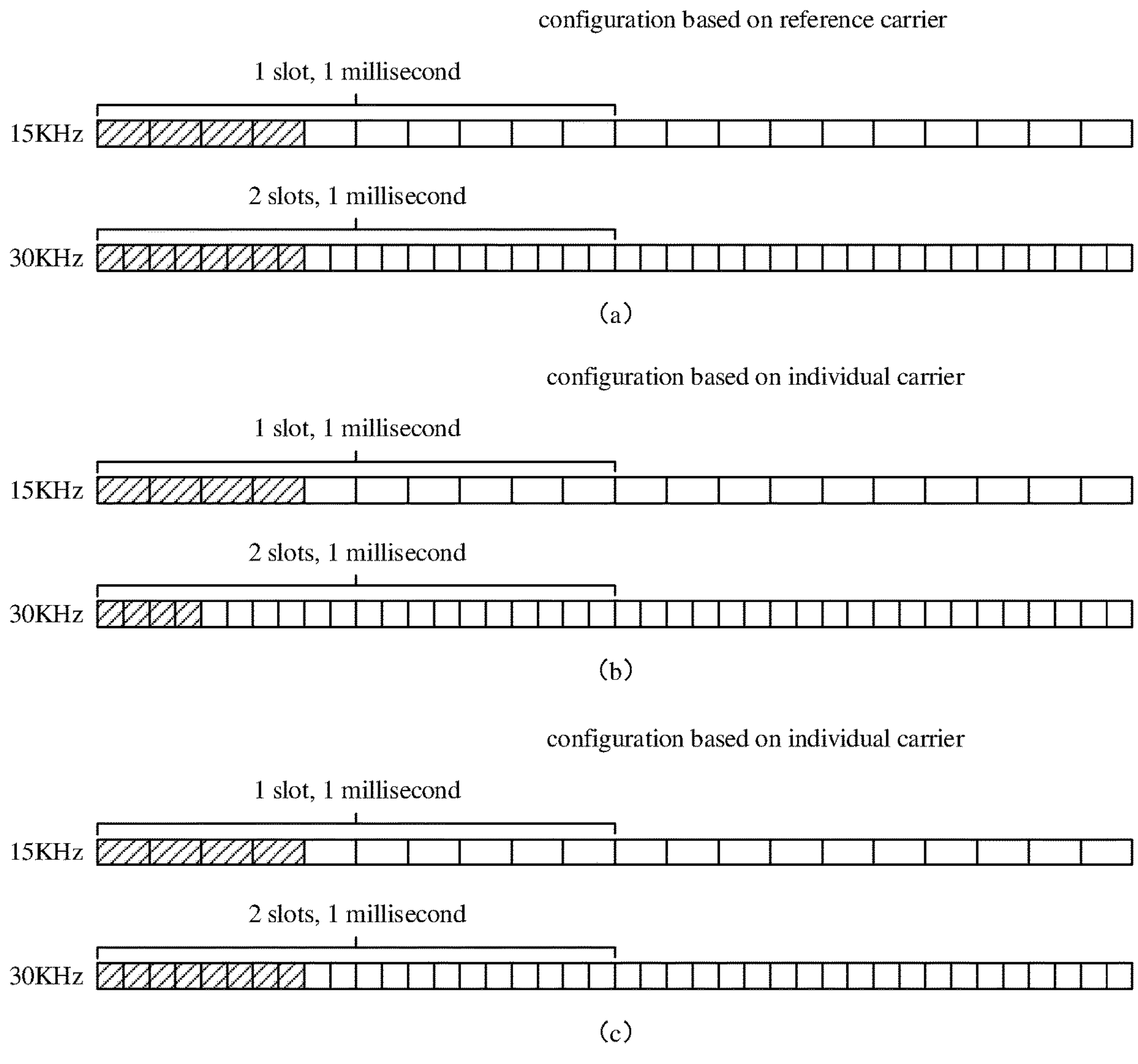
FIG. 3 is a schematic diagram of a time domain resource provided by an exemplary embodiment of the disclosure.

For example, as shown in FIG. 3(*a*), the SCS of the reference carrier is 15 KHz (kilohertz). Based on the time domain parameter corresponding to the reference carrier in the first resource configuration information, it can be determined that the time domain resource on the reference carrier occupy 4 symbols. For a carrier with a SCS of 30 KHz, 30 KHz is greater than 15 KHz, and the larger the SCS, the shorter a duration of a symbol is, thus, a time domain resource on the carrier with the SCS of 30 KHz occupies 8 symbols, and these 8 symbols are in the same time positions as the 4 symbols occupied by the time domain resource on the reference carrier. In other words, the time domain resource on the carrier with the SCS of 30 KHz is the same as the time domain resource on the reference carrier.

In another example, the first resource configuration information includes a time domain parameter corresponding to each carrier of the at least one carrier, and the time domain parameter is used to indicate the time domain resource on a corresponding carrier. Optionally, the time domain parameter includes at least one of: a cycle, a start slot, a start symbol, or a number of occupied symbols. In this example, when SCSs on two carriers are different, time domain resources on the two carriers may be different or may be the same, which is not limited in this example.

In this example, in the case where there are at least two carriers on which the SCSs are different, by separately configuring the time domain resource for each carrier in the at least one carrier, the time domain resources may be configured differently and pertinently based on the characteristics of each carrier, to realize a precise and fine-grained resource configuration.

For example, the at least one carrier includes a first carrier and a second carrier, and a SCS on the first carrier is different from a SCS on the second carrier. Optionally, in response to the SCS on the first carrier being less than the SCS on the second carrier, a time domain resource on the first carrier includes a time domain resource on the second carrier. That is, the network device configures the time domain parameter separately for each carrier. The configuration of the time domain parameter satisfies a condition that a time domain resource on a carrier with a smaller SCS contains a time domain resource on a carrier with the larger SCS.

For example, as shown in FIG. 3(*b*), 15 KHz is less than 30 KHz, and the time domain resource on the carrier with the SCS of 15 KHz occupies 4 symbols, the time domain resource on the carrier with the SCS of 30 KHz occupies part of symbols in the 8 symbols that art at the same time positions as these 4 symbols. Optionally, the part of symbols are consecutive symbols in the 8 symbols, such as 4 consecutive symbols in the 8 symbols.

For example, the at least one carrier includes a third carrier and a fourth carrier, and a SCS on the third carrier is different from a SCS on the fourth carrier. Optionally, in response to a time domain resource on the third carrier is identical to a time domain resource on the fourth carrier, a time domain parameter corresponding to the third carrier is different from a time domain parameter corresponding to the fourth carrier. That is, the network device configures a time domain parameter for each carrier separately, and the time domain parameters corresponding to carriers with different SCSs are different, but time domain resources indicated by the carriers with different SCSs are identical.

For example, as shown in FIG. 3(*c*), 15 KHz is less than 30 KHz, and the time domain resource on the carrier with the SCS of 15 KHz occupies 4 symbols, the time domain resource on the carrier with the SCS of 30 KHz occupies all of 8 symbols that are in the same time positions as these 4 symbols.

It is noted that in the case where SCSs on at least two carriers in the at least one carrier are different, the network device may configure the time domain parameter for each carrier of the at least one carrier separately. The network device may uniformly configure a time domain parameter for the carriers with the same SCSs in the at least one carrier, and configure time domain parameters for the carriers with different SCSs in the at least one carrier separately. The introduction and description of configuring the time domain parameter for the carriers with the same SCS uniformly and configuring the time domain parameters for the carriers with different SCSs separately, can be referred to the above embodiments, which will not be repeated here.

Introduction and description of the frequency domain position and the frequency domain parameter are given below.

In an example, the first resource configuration information includes a frequency domain parameter corresponding to each carrier in the at least one carrier, and the frequency domain parameter is configured to indicate a frequency domain resource on each carrier. That is, the network device configures the frequency domain parameter for each carrier in the at least one carrier separately. Optionally, the frequency domain parameter includes a starting physical resource block and/or a frequency domain comb size. The frequency domain comb size is used to indicate a number of resource elements by which the first reference signal in the frequency domain is spaced. In this example, by separately configuring the frequency domain resource for each carrier of the at least one carrier, it is conducive to achieve a precise and fine-grained resource configuration.

In another example, the first resource configuration information includes a frequency domain parameter corresponding to a fifth carrier in the at least one carrier, and the frequency domain parameter corresponding to the fifth carrier is used to indicate a frequency domain resource on the fifth carrier. Optionally, a frequency domain parameter corresponding to each carrier other than the fifth carrier in the at least one carrier is a default parameter. For example, a position of a starting physical resource block corresponding to each carrier other than the fifth carrier is set to 0 by default. Or, the frequency domain parameter corresponding to each carrier other than the fifth carrier in the at least one carrier is identical to the frequency domain parameter corresponding to the fifth carrier. For example, a frequency domain comb size corresponding to each carrier other than the fifth carrier is identical to the frequency domain comb size corresponding to the fifth carrier. That is, the network device configures a frequency domain parameter of only one of the at least one carrier, and other carriers use a default frequency domain parameter (i.e., the default parameter) or use the same frequency domain parameter configured by the network device for that carrier. Optionally, the default parameter is predefined by a communication protocol or pre-configured by the network device. Optionally, the frequency domain parameter includes a starting physical resource block and/or a frequency domain comb size. The frequency domain comb size is used to indicate a number of resource elements by which the first reference signal is spaced in the frequency domain. In this example, by configuring the frequency domain resource on one carrier, the frequency domain resources on other carriers are identical to the frequency domain resource on the one carrier or are a default value. Since the network device only needs to configure the frequency domain resource on one carrier, the configuration overhead of the network device for the frequency domain resource can be reduced, and the number of bits occupied by the first resource configuration information can also be reduced.

The transmitting power is described and explained below.

In an example, a transmitting power of the first reference signal is positively correlated with a space between the at least one carrier. That is, the transmitting power of the first reference signal is determined based on the space between the at least one carrier. The greater the space between the at least one carrier, the greater the transmitting power of the first reference signal is. For example, the first reference signal includes a PRS, and a transmitting power of the PRS is positively correlated with the space between the at least one carrier. In this example, by determining the transmitting power of the first reference signal based on the space between the carriers, it is ensured that the transmitting power of the first reference signal can support transmission of the first reference signal based on carrier aggregation.

In another example, the transmitting power of the first reference signal is identical to a transmitting power of a second reference signal. Or, the transmitting power of the first reference signal is determined based pm the transmitting power of the second reference signal. The second reference signal includes at least one of: a Synchronization Signal Block (SSB), or a reference signal for calculating a path loss. For example, the first reference signal includes a PRS, and a transmitting power of the PRS is identical to a transmitting power of the SSB. Or, the first reference signal includes a SRS, and a transmitting power of the SRS is determined based on a reference signal for calculating the path loss. In this example, by determining the transmitting power of the first reference signal with reference to the transmitting power of the second reference signal, repeated calculations of the transmitting power of the first reference signal can be avoided, to reduce calculation and processing overhead.

In conclusion, in the technical solutions provided by the embodiments of the disclosure, the positioning accuracy is improved by transmitting, based on carrier aggregation, the reference signal for realizing positioning. Moreover, in the embodiments of the disclosure, the network device sends the resource configuration information to the terminal, to indicate to the terminal the transmission resource of the reference signal for realizing positioning, such as the time domain resource, the frequency domain resource, the transmitting power, etc. A method for configuring a reference signal for realizing positioning in the case of carrier aggregation is provided, to improve the positioning accuracy.

It is noted that in the above embodiments, the resource configuration method provided by the embodiments of the disclosure is introduced and explained from the perspective of interaction between the terminal and the network device. In the above embodiments, the steps performed by the terminal may be separately realized as the resource configuration method on the terminal side, and the steps performed by the network device may be separately realized as the resource configuration method on the network device side.

Figure 4:
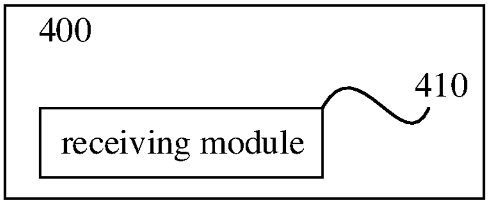
FIG. 4 is a block diagram of a resource configuration apparatus provided by an exemplary embodiment of the disclosure.

FIG. 4 is a block diagram of a resource configuration apparatus provided by an exemplary embodiment of the disclosure. As shown in FIG. 4, the apparatus is applied to a terminal. The apparatus 400 includes: a receiving module 410.

The receiving module 410 is configured to receive first resource configuration information sent by a network device, the first resource configuration information indicating a transmission resource of a first reference signal, and the first reference signal being a reference signal for a positioning purpose; in which, a frequency domain resource in the transmission resource includes at least one carrier.

In an example, a SCS on the at least one carrier is identical.

In an example, the first resource configuration information includes a time domain parameter corresponding to the transmission resource, the time domain parameter indicating a time domain resource on the at least one carrier, and the time domain resource on the at least one carrier is identical.

In an example, at least two carriers in the at least one carrier have different SCSs.

In an example, the first resource configuration information includes a time domain parameter corresponding to a reference carrier in the at least one carrier, the time domain parameter corresponding to the reference carrier indicating a time domain resource on the reference carrier.

In an example, the reference carrier is a carrier having a minimum SCS in the at least one carrier, or, the reference carrier is a carrier having a maximum SCS in the at least one carrier.

In an example, a time domain resource on each carrier other than the reference carrier in the at least one carrier is identical to the time domain resource on the reference carrier.

In an example, the first resource configuration information includes a time domain parameter corresponding to each carrier of the at least one carrier, the time domain parameter indicating a time domain resource on each carrier.

In an example, the at least one carrier includes a first carrier and a second carrier; and in response to a SCS on the first carrier being less than a SCS on the second carrier, a time domain resource on the first carrier includes a time domain resource on the second carrier.

In an example, the at least one carrier includes a third carrier and a fourth carrier, and a time domain resource on the third carrier is identical to a time domain resource on the fourth carrier; and in response to a SCS on the third carrier being different from a SCS on the fourth carrier, a time domain parameter corresponding to the third carrier is different from a time domain parameter corresponding to the fourth carrier.

In an example, the time domain parameter includes at least one of: a cycle, a start slot, a start symbol, or a number of occupied symbols.

In an example, the first resource configuration information includes a frequency domain parameter corresponding to each carrier of the at least one carrier, the frequency domain parameter indicating a frequency domain resource on each carrier.

In an example, the first resource configuration information includes a frequency domain parameter corresponding to a fifth carrier in the at least one carrier, the frequency domain parameter corresponding to the fifth carrier indicating a frequency domain resource on the fifth carrier.

In an example, a frequency domain parameter corresponding to each carrier other than the fifth carrier in the at least one carrier is a default parameter, or, the frequency domain parameter corresponding to each carrier other than the fifth carrier in the at least one carrier is identical to the frequency domain parameter corresponding to the fifth carrier.

In an example, the frequency domain parameter includes a starting physical resource block and/or a frequency domain comb size, and frequency domain comb size indicating a number of resource elements by which the first reference signal is spaced in the frequency domain.

In an example, a transmitting power of the first reference signal is positively correlated with a space between the at least one carrier.

In an example, a transmitting power of the first reference signal is identical to a transmitting power of a second reference signal, or, the transmitting power of the first reference signal is determined based on the transmitting power of the second reference signal, and the second reference signal includes: a SSB, or a reference signal for calculating a path loss.

In an example, the first reference signal includes at least one of: a PRS or a SRS.

Figure 5:
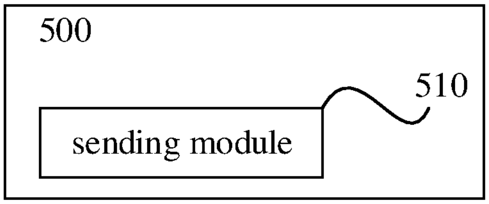
FIG. 5 is a block diagram of a resource configuration apparatus provided by an exemplary embodiment of the disclosure.

FIG. 5 is a block diagram of a resource configuration apparatus provided by an exemplary embodiment of the disclosure. As shown in FIG. 5, the apparatus is applied to a network device. The apparatus 500 includes: a sending module 510.

The sending module 510 is configured to send first resource configuration information to a terminal, the first resource configuration information indicating a transmission resource of a first reference signal, and the first reference signal being a reference signal for a positioning purpose; in which, a frequency domain resource in the transmission resource includes at least one carrier.

In an example, the SCS on the at least one carrier is identical.

In an example, the first resource configuration information includes a time domain parameter corresponding to the transmission resource, the time domain parameter indicating a time domain resource on the at least one carrier, and the time domain resource on the at least one carrier is identical.

In an example, at least two carriers in the at least one carrier have different SCSs.

In an example, the first resource configuration information includes a time domain parameter corresponding to a reference carrier in the at least one carrier, the time domain parameter corresponding to the reference carrier indicating a time domain resource on the reference carrier.

In an example, the reference carrier is a carrier having a minimum SCS in the at least one carrier, or, the reference carrier is a carrier having a maximum SCS in the at least one carrier.

In an example, a time domain resource on each carrier other than the reference carrier in the at least one carrier is identical to the time domain resource on the reference carrier.

In an example, the first resource configuration information includes a time domain parameter corresponding to each carrier of the at least one carrier, the time domain parameter indicating a time domain resource on each carrier.

In an example, the at least one carrier includes a first carrier and a second carrier; and in response to a SCS on the first carrier being less than a SCS on the second carrier, a time domain resource on the first carrier includes a time domain resource on the second carrier.

In an example, the at least one carrier includes a third carrier and a fourth carrier, and a time domain resource on the third carrier is identical to a time domain resource on the fourth carrier; and in response to a SCS on the third carrier being different from a SCS on the fourth carrier, a time domain parameter corresponding to the third carrier is different from a time domain parameter corresponding to the fourth carrier.

In an example, the time domain parameter includes at least one of: a cycle, a start slot, a start symbol, or a number of occupied symbols.

In an example, the first resource configuration information includes a frequency domain parameter corresponding to each carrier of the at least one carrier, the frequency domain parameter indicating a frequency domain resource on each carrier.

In an example, the first resource configuration information includes a frequency domain parameter corresponding to a fifth carrier in the at least one carrier, the frequency domain parameter corresponding to the fifth carrier indicating a frequency domain resource on the fifth carrier.

In an example, a frequency domain parameter corresponding to each carrier other than the fifth carrier in the at least one carrier is a default parameter, or, the frequency domain parameter corresponding to each carrier other than the fifth carrier in the at least one carrier is identical to the frequency domain parameter corresponding to the fifth carrier.

In an example, the frequency domain parameter includes a starting physical resource block and/or a frequency domain comb size, the frequency domain comb size indicating a number of resource elements by which the first reference signal is spaced in the frequency domain.

In an example, a transmitting power of the first reference signal is positively correlated with a space between the at least one carrier.

In an example, a transmitting power of the first reference signal is identical to a transmitting power of a second reference signal, or, the transmitting power of the first reference signal is determined based on the transmitting power of the second reference signal, and the second reference signal includes: a SSB, or a reference signal for calculating a path loss.

In an example, the first reference signal includes at least one of: a PRS or a SRS.

Figure 6:
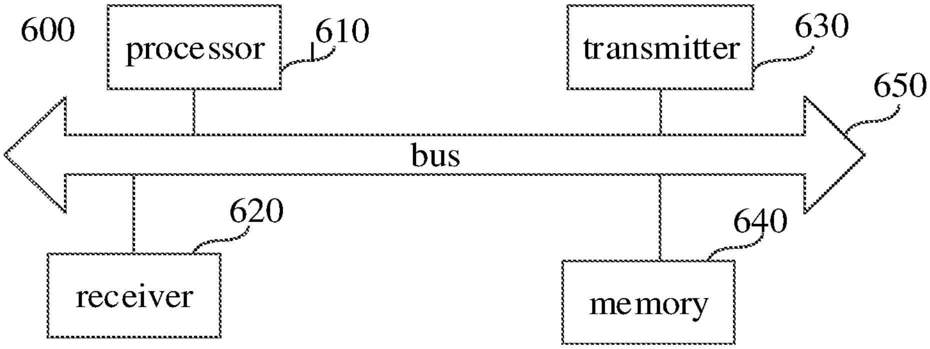
FIG. 6 is a schematic diagram of a communication device provided by an exemplary embodiment of the disclosure.

FIG. 6 is a schematic diagram of a communication device 600 (which may be realized as the above terminal or the above network device) provided by an exemplary embodiment of the disclosure. The communication device 600 includes: a processor 610, a receiver 620, and a transmitter 630, a memory 640 and a bus 650.

The processor 610 includes: one or more processing cores. The processor 610 executes various functional applications and information processing by running software programs and modules.

The receiver 620 and the transmitter 630 can be implemented as a communication component, which can be a communication chip.

The memory 640 is connected to the processor 610 via the bus 650.

The memory 640 is configured to store at least one instruction. The processor 610 is configured to execute the at least one instruction to implement the steps executed by the terminal in the above method embodiments, or to implement the steps executed by the network device in the above method embodiments.

In addition, the memory 640 may be realized by any type of volatile or non-volatile storage device or combinations thereof. The volatile or non-volatile storage device includes, but is not limited to: a magnetic or optical disk, an Erasable Programmable Read Only Memory (EEPROM), an Erasable Programmable Read Only Memory (EPROM), a Static Random Access Memory (SRAM), a Read-Only Memory (ROM), a magnetic memory, a flash memory, and a Programmable ROM (PROM).

An exemplary embodiment of the disclosure also provides a resource configuration system. The system includes: a terminal and a network device. The terminal includes the resource configuration apparatus provided in the embodiment as shown in FIG. 4, and the network device includes the resource configuration apparatus provided by the embodiment as shown in FIG. 5.

An exemplary embodiment of the disclosure also provides a computer-readable storage medium having at least one instruction, at least one program segment, a code set or an instruction set stored thereon. The at least one instruction, the at least one program segment, the code set or the instruction set is loaded and executed by a processor to implement the steps executed by the terminal in the resource configuration method provided by the above method embodiments.

An exemplary embodiment of the disclosure also provides a computer-readable storage medium having at least one instruction, at least one program segment, a code set or an instruction set stored thereon. The at least one instruction, the at least one program segment, the code set or the instruction set is loaded and executed by a processor to implement the steps executed by the network device in the resource configuration method provided by the above method embodiments.

It is understood that the term "multiple" in the disclosure refers to two or more. The term "and/or" describes a relation of associated objects, which indicates three relations, for example, "A and/or B" may indicate that A exists alone, A and B both exist, and B exists alone. The character "/" generally indicates that the associated objects prior to and after the character "/" is an "or" relation.

Other embodiments of the disclosure will be apparent to those skilled in the art from consideration of the specification and practice of the disclosure disclosed here. This disclosure is intended to cover any variations, uses, or adaptations of the disclosure following the general principles thereof and including such departures from the disclosure as come within known or customary practice in the art. It is intended that the specification and embodiments are considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. The scope of the disclosure only be limited by the appended claims.

What is claimed is:

1. A resource configuration method, performed by a terminal, comprising:

receiving first resource configuration information sent by a network device, the first resource configuration information indicating a transmission resource of a first reference signal, and the first reference signal being a reference signal for a positioning purpose;

wherein, a frequency domain resource in the transmission resource comprises at least one carrier; and the first resource configuration information comprises a time domain parameter corresponding to the transmission resource, the time domain parameter indicating a time domain resource on the at least one carrier, and the time domain resource on the at least one carrier is identical.

2. The method of claim 1, wherein a subcarrier space on the at least one carrier is identical; or wherein at least two carriers in the at least one carrier have different subcarrier spaces.

3. The method of claim 1, wherein the time domain parameter comprises at least one of: a cycle, a start slot, a start symbol, or a number of occupied symbols.

4. The method of claim 1, wherein the first resource configuration information comprises a time domain parameter corresponding to a reference carrier in the at least one carrier, the time domain parameter corresponding to the reference carrier indicating a time domain resource on the reference carrier;

wherein a time domain resource on each carrier other than the reference carrier in the at least one carrier is identical to the time domain resource on the reference carrier;

wherein the reference carrier is a carrier having a minimum subcarrier space in the at least one carrier, or a carrier having a maximum subcarrier space in the at least one carrier;

wherein the time domain parameter comprises at least one of: a cycle, a start slot, a start symbol, or a number of occupied symbols.

5. The method of claim 1, wherein the first resource configuration information comprises a time domain parameter corresponding to each carrier of the at least one carrier, the time domain parameter indicating a time domain resource on each carrier; wherein the time domain parameter comprises at least one of: a cycle, a start slot, a start symbol, or a number of occupied symbols.

6. The method of claim 5, wherein:

the at least one carrier comprises a first carrier and a second carrier; and in response to a subcarrier space on the first carrier being less than a subcarrier space on the second carrier, a time domain resource on the first carrier comprises a time domain resource on the second carrier; or the at least one carrier comprises a third carrier and a fourth carrier, and a time domain resource on the third carrier is identical to a time domain resource on the fourth carrier.

7. The method of claim 1, wherein the first resource configuration information comprises a frequency domain parameter corresponding to each carrier of the at least one carrier, the frequency domain parameter indicating a frequency domain resource on each carrier; or wherein the first resource configuration information comprises a frequency domain parameter corresponding to a fifth carrier in the at least one carrier, the frequency domain parameter corresponding to the fifth carrier indicating a frequency domain resource on the fifth carrier; wherein a frequency domain parameter corresponding to each carrier other than the fifth carrier in the at least one carrier is a default parameter, or identical to the frequency domain parameter corresponding to the fifth carrier.

8. The method of claim 7, wherein the frequency domain parameter comprises at least one of: a starting physical resource block and/or or a frequency domain comb size, the frequency domain comb size indicating a number of resource elements by which the first reference signal is spaced in the frequency domain.

9. The method of claim 1, wherein a transmitting power of the first reference signal is configured as one of:

the transmitting power of the first reference signal being positively correlated with a space between the at least one carrier;

the transmitting power of the first reference signal being identical to a transmitting power of a second reference signal; or the transmitting power of the first reference signal being determined based on the transmitting power of the second reference signal;

wherein the second reference signal comprises: a synchronization signal block (SSB), or a reference signal for calculating a path loss.

10. A resource configuration method, performed by a network device, comprising:

sending first resource configuration information to a terminal, the first resource configuration information indicating a transmission resource of a first reference signal, and the first reference signal being a reference signal for a positioning purpose;

wherein, a frequency domain resource in the transmission resource comprises at least one carrier; and the first resource configuration information comprises a time domain parameter corresponding to the transmission resource, the time domain parameter indicating a time domain resource on the at least one carrier, and the time domain resource on the at least one carrier is identical.

11. The method of claim 10, wherein a subcarrier space on the at least one carrier is identical; or wherein at least two carriers in the at least one carrier have different subcarrier spaces.

12. The method of claim 10, wherein the time domain parameter comprises at least one of: a cycle, a start slot, a start symbol, or a number of occupied symbols.

13. The method of claim 10, wherein the first resource configuration information comprises a time domain parameter corresponding to a reference carrier in the at least one carrier, the time domain parameter corresponding to the reference carrier indicating a time domain resource on the reference carrier;

wherein a time domain resource on each carrier other than the reference carrier in the at least one carrier is identical to the time domain resource on the reference carrier;

wherein the reference carrier is a carrier having a minimum subcarrier space in the at least one carrier, or a carrier having a maximum subcarrier space in the at least one carrier;

wherein the time domain parameter comprises at least one of: a cycle, a start slot, a start symbol, or a number of occupied symbols.

14. The method of claim 10, wherein the first resource configuration information comprises a time domain parameter corresponding to each carrier of the at least one carrier, the time domain parameter indicating a time domain resource on each carrier;

wherein the time domain parameter comprises at least one of: a cycle, a start slot, a start symbol, or a number of occupied symbols.

15. The method of claim 14, wherein the at least one carrier comprises a first carrier and a second carrier; and in response to a subcarrier space on the first carrier being less than a subcarrier space on the second carrier, a time domain resource on the first carrier comprises a time domain resource on the second carrier; or the at least one carrier comprises a third carrier and a fourth carrier, and a time domain resource on the third carrier is identical to a time domain resource on the fourth carrier.

16. The method of claim 10, wherein the first resource configuration information comprises a frequency domain parameter corresponding to each carrier of the at least one carrier, the frequency domain parameter indicating a frequency domain resource on each carrier; or wherein the first resource configuration information comprises a frequency domain parameter corresponding to a fifth carrier in the at least one carrier, the frequency domain parameter corresponding to the fifth carrier indicating a frequency domain resource on the fifth carrier; wherein a frequency domain parameter corresponding to each carrier other than the fifth carrier in the at least one carrier is a default parameter, or, the frequency domain parameter corresponding to each carrier other than the fifth carrier in the at least one carrier is identical to the frequency domain parameter corresponding to the fifth carrier.

17. The method of claim 16, wherein the frequency domain parameter comprises at least one of a starting physical resource block or a frequency domain comb size, the frequency domain comb size indicating a number of resource elements by which the first reference signal is spaced in the frequency domain.

18. The method of claim 10, wherein a transmitting power of the first reference signal is configured as one of:

the transmitting power of the first reference signal being positively correlated with a space between the at least one carrier;

the transmitting power of the first reference signal being identical to a transmitting power of a second reference signal; or the transmitting power of the first reference signal being determined based on the transmitting power of the second reference signal;

wherein the second reference signal comprises: a synchronization signal block (SSB), or a reference signal for calculating a path loss.

19. A terminal, comprising:

a processor; and a transceiver coupled to the processor;

wherein the processor is configured to:

receive first resource configuration information sent by a network device, the first resource configuration information indicating a transmission resource of a first reference signal, and the first reference signal being a reference signal for a positioning purpose; wherein a frequency domain resource in the transmission resource comprises at least one carrier;

wherein the first resource configuration information comprises a time domain parameter corresponding to the transmission resource, the time domain parameter indicating a time domain resource on the at least one carrier, and the time domain resource on the at least one carrier is identical.

20. A network device, comprising:

a processor; and a transceiver coupled to the processor;

wherein the processor is configured to perform the method of claim 10.

* * * * *